US010431006B2

(12) United States Patent
Mahler et al.

(10) Patent No.: US 10,431,006 B2
(45) Date of Patent: Oct. 1, 2019

(54) MULTISENSORY AUGMENTED REALITY

(71) Applicant: Disney Enterprises, Inc., Burbank, CA (US)

(72) Inventors: Moshe B. Mahler, Pittsburgh, PA (US); John A. Mars, Pittsburgh, PA (US); James L. McCann, Pittsburgh, PA (US); Ali Israr, Monroeville, PA (US); Shawn Lawson, Albany, NY (US); Kyna P. McIntosh, Pittsburgh, PA (US); Job T. Bedford, Baltimore, MD (US)

(73) Assignee: Disney Enterprises, Inc., Burbank, CA (US)

( * ) Notice: Subject to any disclaimer, the term of this patent is extended or adjusted under 35 U.S.C. 154(b) by 51 days.

(21) Appl. No.: 15/497,439

(22) Filed: Apr. 26, 2017

(65) Prior Publication Data

US 2018/0315243 A1  Nov. 1, 2018

(51) Int. Cl.
*G06T 19/00* (2011.01)
*G06T 11/60* (2006.01)
*G06F 3/01* (2006.01)
*G06T 19/20* (2011.01)

(52) U.S. Cl.
CPC ............ *G06T 19/006* (2013.01); *G06F 3/011* (2013.01); *G06F 3/016* (2013.01); *G06F 3/017* (2013.01); *G06T 11/60* (2013.01); *G06T 19/20* (2013.01); *G06T 2219/024* (2013.01)

(58) Field of Classification Search
CPC ....... G06T 19/006; G06T 11/60; G06T 19/20; G06T 2219/024; G06T 19/003; G06F 3/011; G06F 3/017; G06F 3/16; G06F 3/0346; G06F 3/014; G06F 3/0412; G06F 3/0481; G06F 17/30864; G06F 17/30554; G06F 17/30991; G06F 19/12; G06F 3/016; G06F 16/9558; H04L 12/2812; H04L 12/2827; G06K 9/6263; G06K 9/00671
See application file for complete search history.

(56) References Cited

U.S. PATENT DOCUMENTS

| 8,649,554 | B2 * | 2/2014 | Markovic | G06F 3/017 382/103 |
| 9,841,814 | B1 * | 12/2017 | Kallmeyer | G06T 11/00 |
| 2016/0133230 | A1 * | 5/2016 | Daniels | G06T 19/006 345/633 |
| 2017/0287215 | A1 * | 10/2017 | Lalonde | G06T 19/006 |
| 2017/0287218 | A1 * | 10/2017 | Nuernberger | G06T 19/006 |

\* cited by examiner

*Primary Examiner* — Xilin Guo
(74) *Attorney, Agent, or Firm* — Dorsey & Whitney LLP (57) ABSTRACT

According to one aspect of the present disclosure, a method for providing a multisensory augmented reality environment is disclosed. The method includes receiving a real-time video stream of a physical environment, receiving depth information of one or more objects within the physical environment, generating real-time content depicting the physical environment based on the real-time video stream and the depth information, rendering augmented content, wherein the augmented content integrates original content and the real-time content, generating sensory feedback instructions to provide sensory feedback based on the augmented content, wherein the sensory feedback instructions are dynamically adjusted to changes in the augmented content, transmitting the augmented content for display and instructions to provide sensory feedback correlated to the augmented content.

28 Claims, 9 Drawing Sheets

MULTISENSORY AUGMENTED REALITY

BACKGROUND

Mixed reality (MR) and augmented reality (AR) create exciting opportunities to engage users in immersive experiences, resulting in natural human-computer interaction. Many MR interactions are generated around a first-person point of view (POV). In these cases, the user directs to the environment, which is digitally displayed either through a head-mounted display or a handheld computing device. However, such conventional AR/MR platforms provide an experience that is limited to a single participant's point of view for each piece of equipment, precluding other participants from also interacting without also having their own piece of expensive equipment. In other words, only one person can participate in the experience at a time. In such systems, a user wears an expensive head-mounted display that provides the user with a first-person perspective of a virtual environment. The device uses expensive components, such as accelerometers, to detect the movement of the user's head and adjust the displayed scene based on the detected movement. Some systems also include additional handheld components that can be cumbersome to the user.

SUMMARY

According to one aspect of the present disclosure, a multisensory augmented reality system is disclosed. The system includes a visual augmentation system that displays augmented content, wherein the augmented content is a blend of original content integrated with real-time content, a sensory feedback system that provides sensory feedback to a user based on the augmented content, wherein the sensory feedback dynamically adjusts based on changes in the augmented content, and a processing element in communication with the visual augmentation system and the sensory feedback system. The processing element performs the following operations: receive the real-time content of a physical environment from the visual augmentation system, construct using the real time content a visual representation of the physical environment, integrate the original content with the visual representation to generate the augmented content, and generate and transmit sensory feedback instructions to the sensory feedback system based on the augmented content and the augmented content to the visual augmentation system for display.

According to another aspect of the present disclosure a method for providing a multisensory augmented reality environment is disclosed. The method includes receiving a real-time video stream of a physical environment, receiving depth information of one or more objects within the physical environment, generating real-time content depicting the physical environment based on the real-time video stream and the depth information, rendering augmented content, wherein the augmented content integrates original content and the real-time content, generating sensory feedback instructions to provide sensory feedback based on the augmented content, wherein the sensory feedback instructions are dynamically adjusted to changes in the augmented content, transmitting the augmented content for display and instructions to provide sensory feedback correlated to the augmented content.

According to yet another aspect of the present disclosure, a method for providing an augmented reality environment is disclosed. The method includes determining a correspondence between a camera and a depth sensor, receiving a calibration image and depth information corresponding to a physical environment, generating a real-time content depicting the physical environment based, at least in part, on the image, the depth information, and the correspondence, detecting a physical landmark in the real-time content, aligning a virtual representation of the landmark in a virtual environment with the physical landmark in the real-time content, generating original content in the virtual environment, and transmitting the original content and the real-time content for display.

DETAILED DESCRIPTION

The present disclosure is related to a system for creating an immersive augmented reality experience by manipulating the environment around a user. The system integrates the display of a real-time video stream of users in a physical environment with interactive animated content coupled with auditory and haptic feedback to create an engaging multisensory experience. For example, users may view a video of themselves in a physical environment on a display alongside one or more virtual characters or objects. The user can then interact with the virtual characters or objects through actions in the physical environment, such as speech or movement. In response to the user's actions, the system provides real-time visual, tactile, and/or auditory feedback through the display, speakers, and haptic actuators.

In one embodiment, the system includes a computer, a camera, a depth sensor, a visual display, a haptic feedback system, and an acoustic feedback system. Initially, the camera and the depth sensor are calibrated with one another. To do this, the camera captures a real-time video stream of a physical environment, such as a room, while the depth sensor tracks three-dimensional (3D) depth information of users and objects within the physical environment. The video stream is aligned with and integrated with the 3D depth information and a two-dimensional (2D) background of the video stream to generate a 3D video stream. Once the camera and depth sensor are calibrated, the 3D video stream is aligned with a 3D virtual environment into which computer generated content may be inserted. The 3D video stream and the 3D virtual environment are aligned based on detected landmarks in the 3D video stream and aligned with a digital representation of the landmark in the 3D virtual environment. Computer generated content is rendered in the 3D virtual environment and displayed on the display along with the 3D video stream. The computer generated content can be designed to interact with the known landmarks and/or users whose gestures can be detected by the camera/depth sensor. Auditory and tactile feedback is also rendered to associate the computer generated visuals to sounds and physical sensations in the real-world environment.

Figure 1:
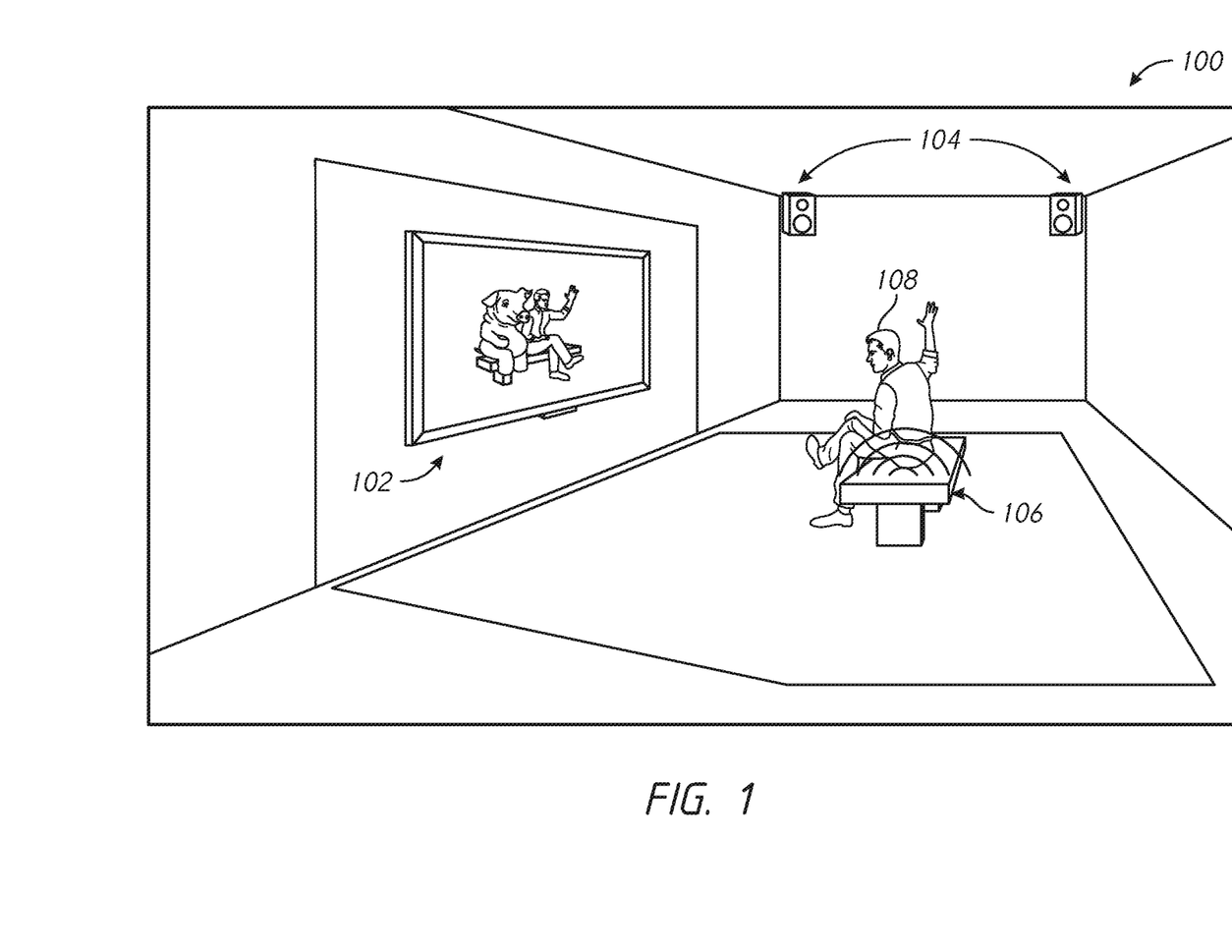
FIG. 1 is a perspective view of a multisensory augmented reality environment.
Figure 2:
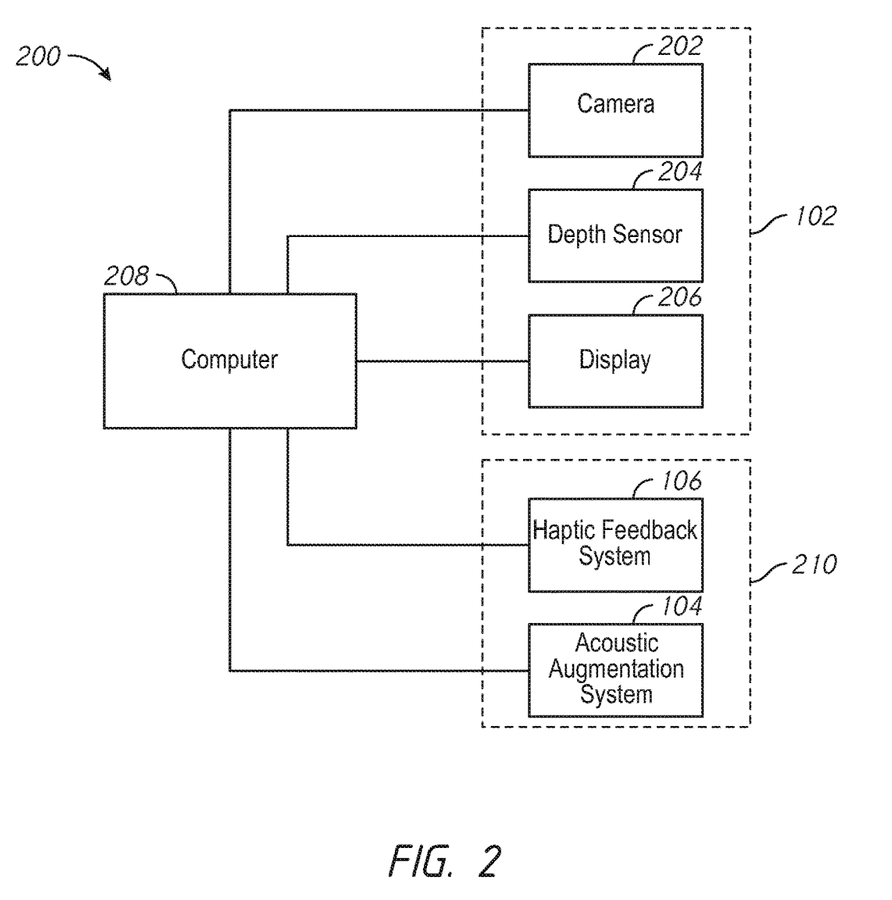
FIG. 2 is a block diagram of an augmented reality system.

Embodiments disclosed herein create a third person point of view interactive augmented reality experience. By displaying the physical environment on a display rather than through a first person head-mounted apparatus, multiple users can simultaneously interact with the virtual environment and engage in the multisensory augmented reality experience. For example, the depth sensor can detect the presence of and gestures of multiple users and the computer can display computer generated content within the real-time video stream responsive to the actions of multiple users. Additionally, by synchronizing the displayed augmented content with additional sensory experiences such as haptic and auditory feedback, may create more immersive experience than in traditional augmented reality systems FIG. 1 is a perspective view of a multisensory augmented reality environment, generally designated 100. The environment 100 includes an augmented reality system that provides a multisensory experience for one or more users 108 located within the environment by combining synchronized, interactive visual, auditory and haptic content. The environment 100 includes a visual augmentation system 102, and a sensory augmentation system that can include an acoustic augmentation system 104, and a haptic feedback system 106. FIG. 2 is a block diagram of an augmented reality system 200 for use in the environment of FIG. 1.

The visual augmentation system 102 captures and displays real-time content, such as a real-time video stream of the user 108 within the environment 100 augmented with computer generated content in three dimensions. With reference to FIG. 2, an augmented reality system 200 in accordance with the embodiment of FIG. 1 is shown. The augmented reality system 200 includes the visual augmentation system 102, which includes a camera 202, a depth sensor 204, and a display 206.

The camera 202 captures calibration images and a real-time video stream of a physical environment, such as a room. The camera 202 includes one or more image sensors, such as a charge-coupled device, a complementary metal-oxide-semiconductor sensor, or the like. The depth sensor 204 captures 3D depth information for one or more objects in the physical environment to reconstruct a 3D digital representation of the physical environment 100. The depth sensor 204 may be a time-of-flight sensor, a 3D interferometer, a structured light 3D scanner, a stereo camera setup, or the like. The camera 202 and the depth sensor 204 are positioned adjacent to one another so as to capture the physical environment along a similar optical axis.

The display 206 provides augmented visual content to a user that includes the real-time video stream of the physical environment with computer generated content integrated into the real-time video stream. The video stream is real-time in that it can be captured by the camera 202 and displayed to a user with little or no perceptible delay between events occurring in the physical environment and being displayed on the display 206. The display 206 may be any suitable display, such as a liquid crystal display, plasma display, organic light emitting diode display, and/or cathode ray tube display. The display 206 may also include an input means, such as touch sensors, a touch screen, a capacitive touch screen, a resistive grid, or the like, that allows for tactile interaction with the display.

Returning to FIG. 1, the acoustic augmentation system 104 provides auditory feedback to the user 108 synchronized with the augmented visual content on the display 206. The acoustic augmentation system 104 may include, for example, speakers, chimes, horns, drums, any other device capable of providing auditory feedback, or a combination thereof. In another example, the acoustic augmentation system 104 is integrated with the physical environment 100. For example, the acoustic augmentation system 104 may include speakers arranged in a surround sound arrangement within a room. The acoustic augmentation system 104 may also be integrated into one or more stationary or moveable objects within the physical environment, such as a bench or a ball, to provide auditory feedback from specific objects or locations depending on the augmented content shown on the display 206.

The haptic feedback system 106 provides tactile feedback to a user or users 108 that is synchronized with the augmented visual content shown on the display 108. The haptic actuators may be any suitable device for providing tactile feedback including, for example, vibrational actuators, linear resonant actuators, forced air generators, mist machines, and the like. In one embodiment, the haptic actuators are integrated into the environment 100. For example, a vibrational actuator may be integrated into an object in the environment 100, such as a bench, and activated to provide vibration to a user sitting on the bench that corresponds to the augmented visual content shown on the display 108. For instance, the bench may be vibrated as a dinosaur, animated on the display 206, walks by.

The acoustic feedback system 104 and the haptic feedback system 106 combine to form a sensory feedback system 210 that provides multisensory feedback to a user 108 in conjunction with the visual feedback system 102. The sensory feedback system 210 dynamically adjusts based on changes in the augmented content as displayed on the display 206. The sensory feedback system can include additional types of feedback or augmentation systems, such as an olfactory augmentation system that provides augmentations in the form of smells to the user 108.

Figure 3:
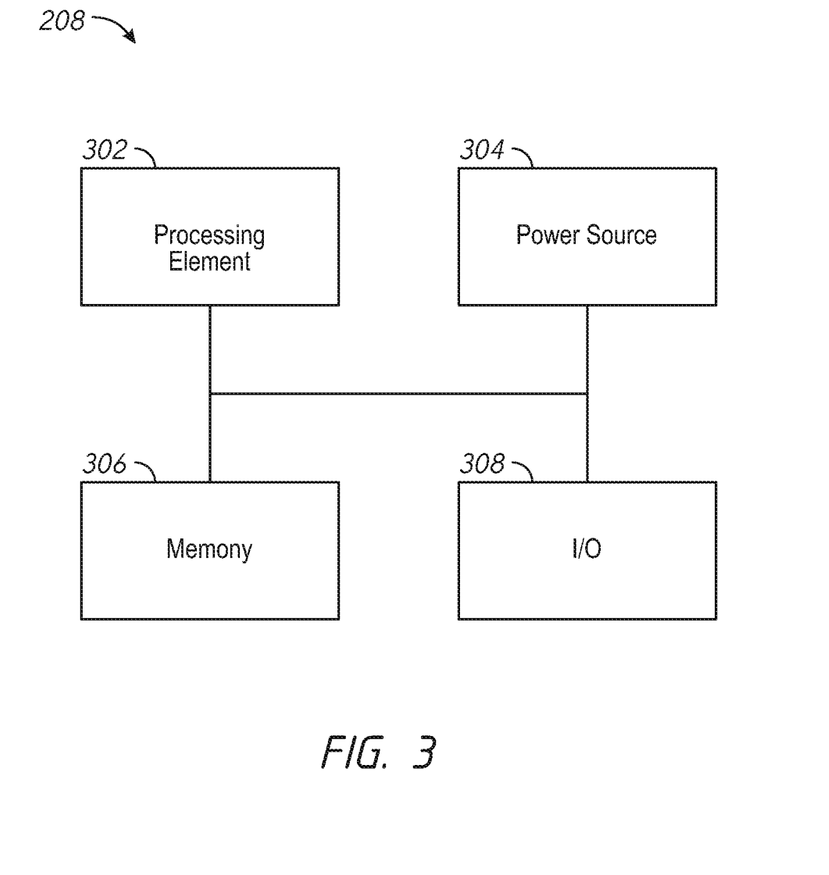
FIG. 3 is a block diagram of a computer of FIG. 2.

The computer 208 analyzes data from the camera 202 and the depth sensor 204 to align a real-time video stream of a physical environment with a virtual environment, renders augmented reality content, and controls the functioning of the display 206, the haptic feedback system 106, and the acoustic augmentation system 104. The computer 208 may be, for example, a desktop computer, a laptop computer, a tablet computer, a smartphone, a server computer, and/or a distributed computing system. As shown in FIG. 3, the computer 208 includes a processing element 302, a power source 304, a memory 306, and an input/output (I/O) interface 308.

The processing element 302 is any type of electronic device or devices capable of processing, receiving, and/or transmitting instructions. For example, the processing element 302 may be a microprocessor, such as a central processing unit or a graphics processing unit. In another embodiment, the processing element 302 may be a microcontroller. Additionally, select components of the computer 208 may be controlled by a first processor and other components may be controlled by a second processor, where the first and second processor may or may not be in communication with each other.

A power source 304 provides power to the components of the computer 208 and may be a battery, power cord, or other element configured to transmit power to the components of the computer 208.

The memory 306 stores data used by the computer 208 to store instructions for the processing element 302, as well as store original content, such as computer generated and multisensory content, for providing an augmented reality experience with the system 100. For example, the memory 306 may store data or content, such as audio files, video files, and so on, corresponding to various applications. The original content can include pre-programmed content or interactive content. For example, pre-programmed content may be displayed from beginning to end, like a movie. Interactive content may include one or more branching operations that may be selected based on user interaction with a digitally displayed scene. Multisensory content can include, for example, sensory feedback instructions that can be provided to the sensory feedback system 210 to play certain sound effects or music using the acoustic augmentation system 104, or to activate the haptic feedback system 106. The memory 306 may be, for example, magneto optical storage, read only memory, random access memory, erasable programmable memory, flash memory, or a combination of one or more types of memory components.

The I/O interface 308 provides communication to and from the computer 208 and the other elements of the system 100. The I/O interface 308 can include one or more input buttons, a communication interface, such as WiFi, Ethernet, or the like, as well as other communication components, such as universal serial bus (USB) cables, or the like.

Figure 4:
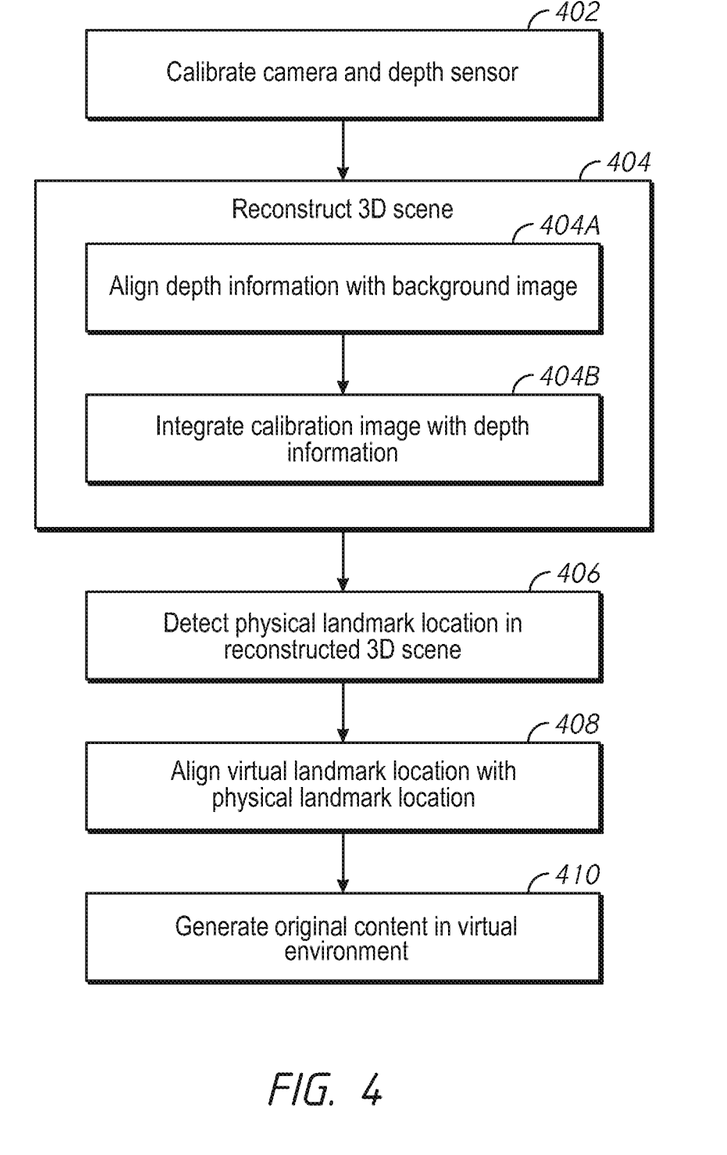
FIG. 4 is a flowchart illustrating a method for aligning a virtual environment and a physical environment.

FIG. 4 is a flowchart illustrating a method for aligning a virtual environment and a reconstructed 3D image of the environment 100, as captured by the camera 202 and the depth sensor 204. By aligning a virtual environment with a 3D reconstructed image of the physical environment 100, original content can be rendered in the virtual environment and displayed concurrently with a real-time video stream of the physical environment 100 on the display 206 so that the original content appears to interact with the physical environment 100 and/or users 108.

In operation 402, the method begins and the processing element 302 calibrates the camera 202 and the depth sensor 204. The processing element 302 receives one or more calibration images of the environment 100 from the camera 202 and depth information of the environment 100 from the depth sensor 204. However, the camera 202 may include internal distortions, such as lens distortion. Additionally, because the camera 202 and the depth sensor 204 typically do not have the same line of sight, slight discrepancies in viewing angle occur between the received calibration images and depth information, which can lead to a variety of undesirable effects, such as depth shadows and inaccurate pixel correlations between the camera 202 and the depth sensor 204. The difference of viewing angle is compensated for through a calibration calculation. The calibration calculation may be performed in any suitable means. For example, the calibration calculation may use intrinsic calibration methods to account for lens distortion coefficients, focal length, and digital transformation of the camera 202 using chessboard calibration techniques.

The calibration calculation may also use extrinsic calibration methods to account for distance and orientation offsets between the camera 202 and the depth sensor 204. Extrinsic calibration may be performed using edge or point detection techniques to match points in the depth information captured by the depth sensor 204 to corresponding points in a calibration image captured by the camera 202 to generate a transform between the depth sensor 204 and the camera 202. For example, edge calibration may include using image analysis software to detect edges in the calibration image and the depth information and matching pixels from the calibration image to pixels in the depth information. The resulting transform maps pixels between the camera 202 and the depth sensor 204.

In operation 404, the processing element 302 reconstructs a 3D scene of the environment 100. The reconstructed scene provides a 3D digital representation of the physical space and objects in environment 100. To reconstruct the scene, the processing element 302 combines one or more received calibration images and depth information to generate a 3D digital representation of the environment 100 with information indicating measured depths of objects within the environment 100.

Figure 5:
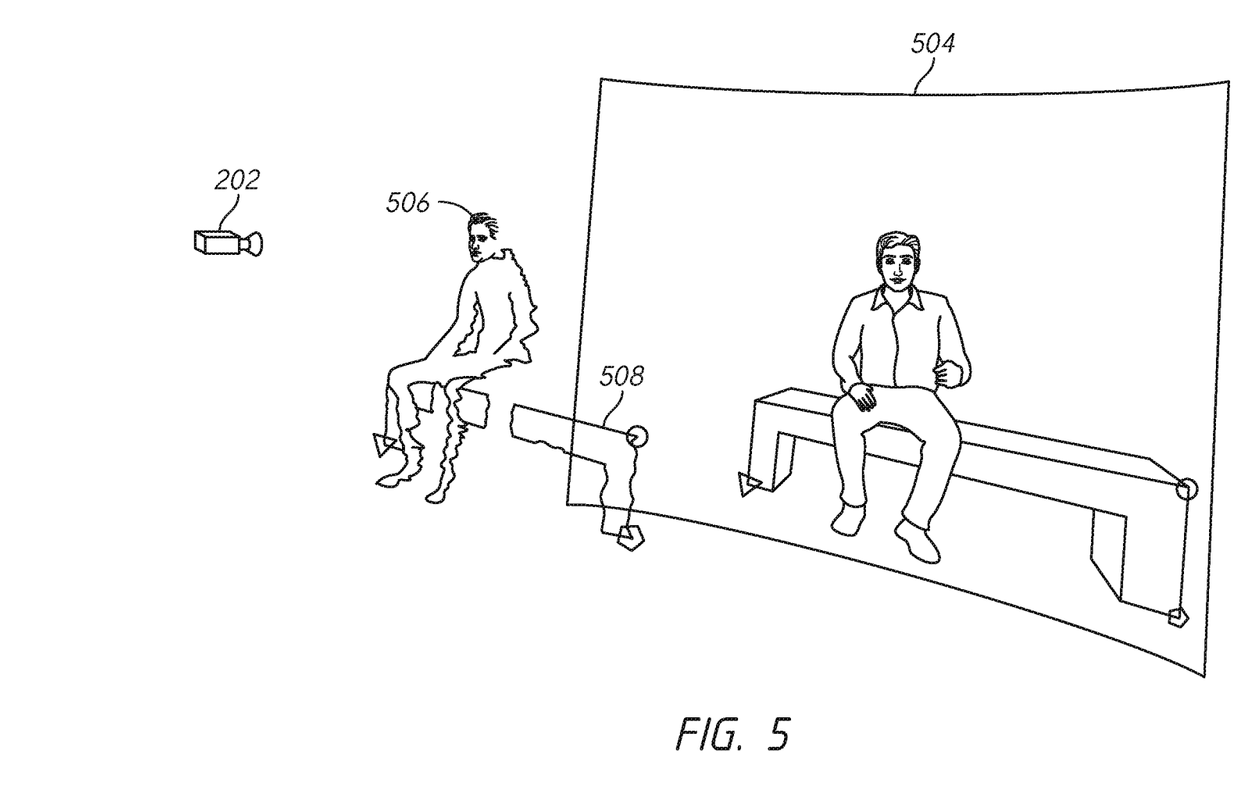
FIG. 5 illustrates a perspective view of an example reconstructed 3D scene, in accordance with the method of FIG. 4.

In one example, the reconstruction of the 3D scene includes aligning depth information from the depth sensor 204 with a background image of the environment from the camera 202 in operation 404A. The depth information is aligned with the background image based on the pixel correspondences determined in operation 402. The aligned background image and depth information constitute a 3D digital reconstruction of the environment 100. In some examples, the depth information includes noise and may contain gaps (e.g., points where there is no depth information) due to physical limitations of the depth sensor 204. By aligning the depth information over a background image of the scene, these gaps can be filled by displaying the pixels shown in the background image at the location of the gaps. FIG. 5 illustrates a perspective view of an example reconstructed 3D scene, in accordance with the method of FIG. 4. A 2D background image 504 is generated from the received calibration image by assigning each pixel in the calibration image a depth value at a predetermined distance from the camera 202. The predetermined distance may be selected such that the calibration image fills the field of view of the depth sensor 204.

Reconstruction of the 3D scene further includes aligning the calibration image of the environment 100 over the depth information in operation 404B. The calibration image is aligned with the optical information based on the pixel correspondences determined in operation 402. In general, the depth information does not include any optical characteristics of the scene. For example, the depth information may appear as greyscale or an artificially colored image where the colors are indicative of the depth of a pixel. Therefore, the calibration image, which may be the same as the background image, is overlaid on the depth information. This overlaying provides color and features to the depth information so that the depth information appears to show the optical features of the scene, as captured by the camera 202. In some examples, operation 404B may be omitted from the reconstruction of the 3D scene, and the overlaying of the calibration image on the depth information may only be performed when the augmented scene is being rendered for display to a user 108, as discussed below with respect to FIG. 6.

In operation 406, the processing element 302 detects a location of a physical landmark 508 in the reconstructed 3D scene. The physical landmark 508 provides an anchor point for aligning the reconstructed 3D scene with a virtual environment into which original content can be animated. The physical landmark 508 may be, for example, an object or point within the environment 100 with a fixed location, such as a bench, a stage, or any other fixed object. The location of the physical landmark 508 may be detected manually or automatically. For example, feature recognition technology may be used to detect corners or edges of the landmark 508. Alternatively, a computer programmer or graphic designer can manually locate the landmark 508.

In operation 408, the processing element 302 aligns a virtual landmark location with a physical landmark location. To improve realism and enhance the augmented reality experience, a virtual environment can include one or more virtual objects that correspond to the known landmark or landmarks within the physical environment 100. For example, the virtual environment may include a virtual bench that corresponds to a physical bench within the environment 100. The virtual landmark within the virtual space and the physical landmark can be automatically aligned or manually aligned. For example, corners and/or edges of the physical landmark 508 can be detected with feature detection software and automatically aligned with the locations of corresponding corners and/or edges of the virtual landmark. Alternatively, a computer programmer or graphic designer may define the locations of the virtual landmark to match the determined locations of the physical landmark 508.

By aligning the virtual landmark with the detected physical landmark 508 in 3D space, original content can programmed in the virtual environment with its own depth information to interact with the virtual landmark in operation 410. When displayed in conjunction with a video stream of the physical environment 100, the original content appears to interact with the physical landmark. For example, in an embodiment where the landmark is a bench, a computer generated character may be animated to sit on the virtual bench, and when the content is displayed on the display 206 along with a stream of the physical environment 100, the character appears to sit on the image of the physical bench displayed on the display 206. Similarly, because original content can be assigned its own depth information, original content can appear on the display to be in front of, aligned with, or behind the image of the physical bench displayed on the display 206.

Figure 6:
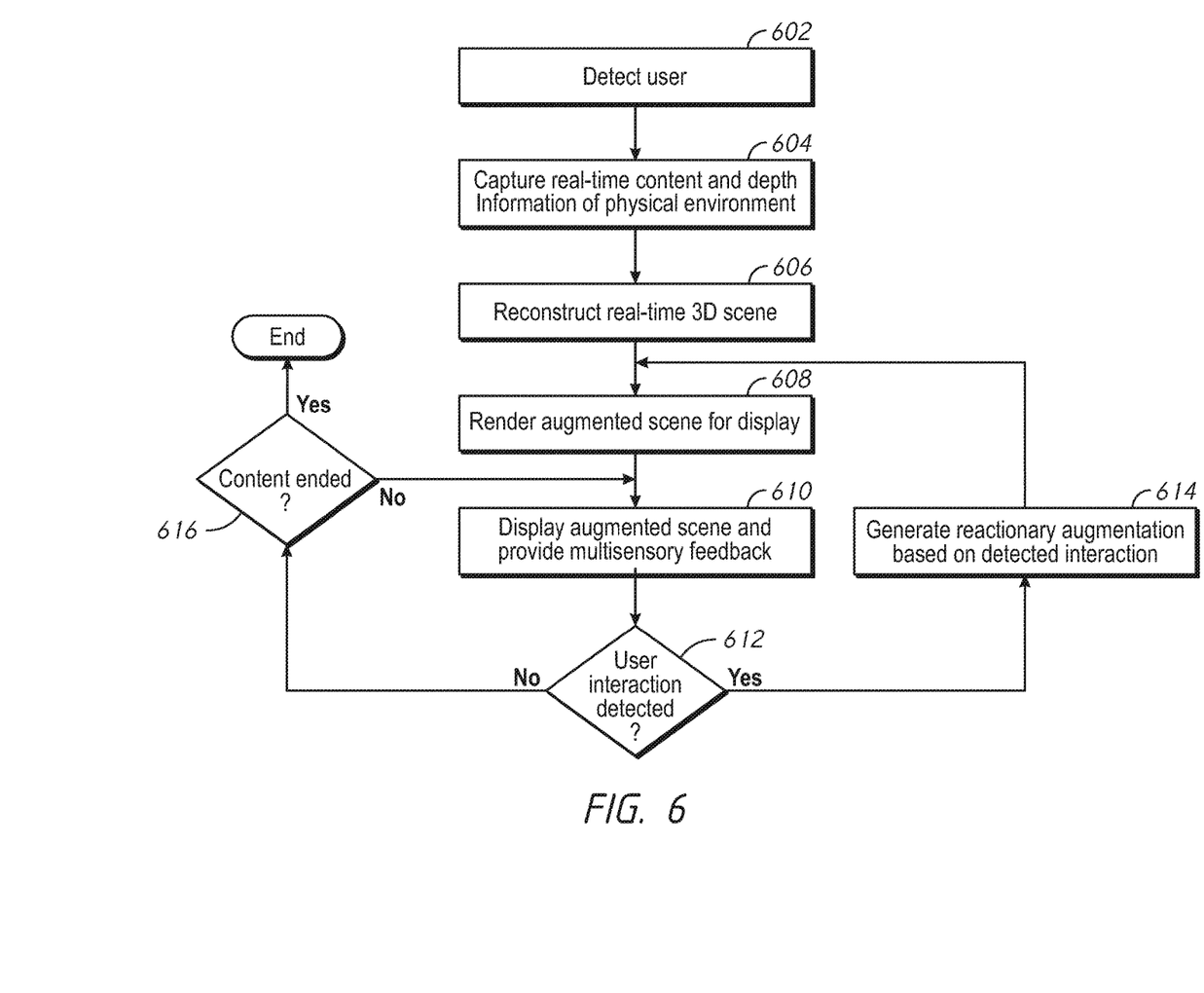
FIG. 6 is a flowchart illustrating a method for generating multisensory augmented reality content.

FIG. 6 is a flowchart illustrating a method for generating multisensory augmented reality content. In operation 602, the method begins and the processing element 302 detects one or more users 108. The user 108 may be detected in any suitable manner. For example, the camera 202 or the depth sensor 204 may act as a motion detector such that when a user 108 enters the environment 100, the camera 202 or the depth sensor 204 transmits a message to the processing element 302 that a user 108 has entered the environment 100. In another example, the user 108 is physically detected within the environment 100. For example, where the environment 100 includes a bench, the bench may have implanted therein a pressure sensor, and when a user 108 sits on the bench, the pressure sensor may detect the user's presence and transmit a signal to the processing element 302. In yet another example, the user 108 may initiate the method by conveying their presence to the processing element 302. For example, a user 108 may press a button or speak into a microphone, which then transmits a signal to the processing element 302 that the user 108 is in the environment 100. By initially detecting the user 108 within the environment 100, the augmented reality system 200 may improve the experience of the user 108 by only providing augmented reality content when the user 108 is present in the environment 100. Thus the experience may appear to be a more tailored, natural experience to the user 108.

In operation 604, the processing element 302 receives real-time content such as a real-time video stream and real-time depth information of the environment 100. The camera 202 captures a real-time video stream of the environment 100, and the depth sensor 204 captures real-time depth information of the environment 100. The real-time video stream and the real-time depth information are transmitted to the processing element 302 and temporarily stored in the memory 306. The real-time video stream and depth information may be stored in the memory 306 only temporarily and deleted once the augmented reality content has been displayed.

In operation 606, the processing element 302 reconstructs the real-time 3D scene to generate a 3D video stream of the environment 100, including any users 108. Operation 606 may be performed in substantially the same manner as described above with respect to operation 404 of FIG. 4, except with real-time content from the camera 202 and the depth sensor 204 instead of the calibration image. For example, a background real-time video stream of the environment 100 is set at a distance from the camera 202. A real-time stream of depth information is aligned with the background video stream based on the pixel correspondences determined in operation 402 of FIG. 4 to fill any gaps in the real-time depth information. The real-time video stream is overlaid on the depth information to provide color and features to the depth information based on the pixel correspondences determined in operation 402 of FIG. 4.

In operation 608, the processing element 302 renders an augmented scene for display. The processing element 302 retrieves the original content from the memory 306 and renders the original content in the virtual environment using, for example, a game engine or other software framework for rendering graphics, executing a physics engine or collision detection, animation, artificial intelligence, or a combination thereof. Because the virtual environment is aligned with the 3D video stream of the environment 100, the original content rendered in the virtual environment appears within the 3D video stream as though it is part of the physical environment 100. In other words, the virtual environment and the 3D video stream are displayed simultaneously and integrated together, occupying the same 3D digital space such that content rendered in one environment is indistinguishable from content rendered in the other environment when they are rendered on the display 206.

In operation 610, the processing element 302 displays the augmented scene and provides multisensory feedback. The processing element 302 transmits the rendered augmented scene to the display 206, which displays the scene to the user 108. The processing element also transmits signals to the acoustic augmentation system 104 and the haptic feedback system 106 to provide auditory and haptic feedback, respectively, to the user 108.

Figure 7A:
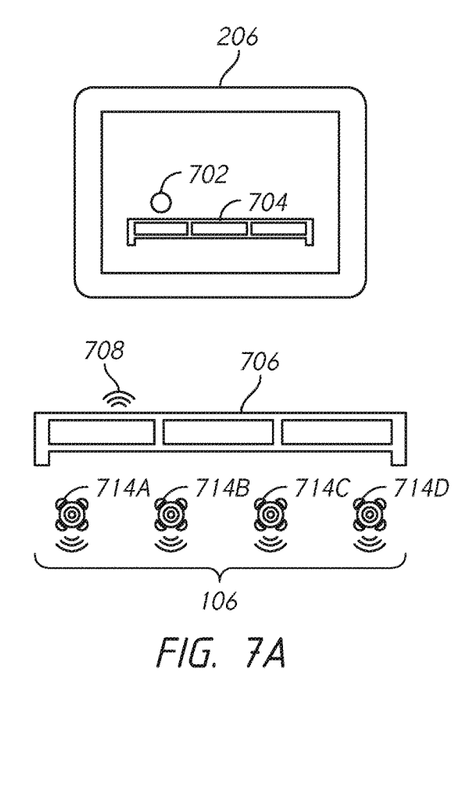
FIGS. 7A-7C illustrate examples of multisensory augmented reality content.
Figure 7B:
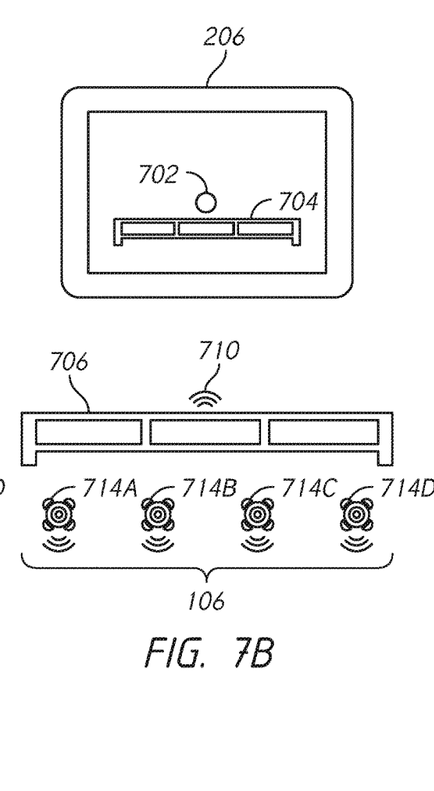
Figure 7C:
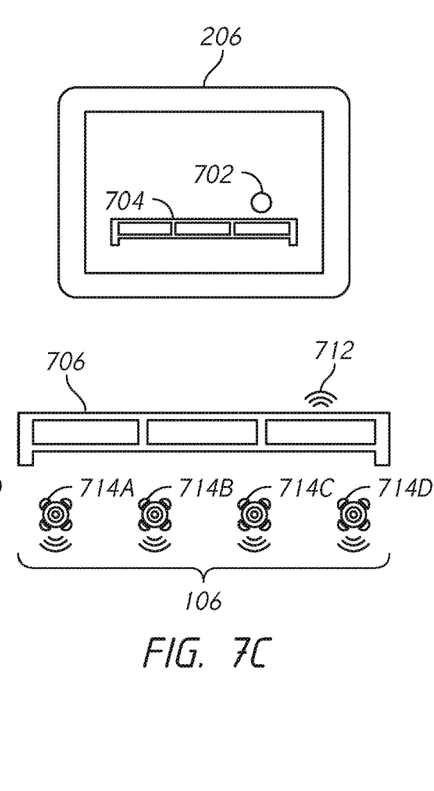

The displayed augmented scene and the auditory and haptic feedback are coordinated to provide an immersive experience for the user in which the user experiences the augmented content through multiple senses. FIGS. 7A-C illustrate coordinated visual and haptic augmentation, in accordance with the embodiment of FIG. 6. Each of FIGS. 7A-C includes the display 206 and the haptic feedback system 106. The haptic feedback system 106 includes a bench 706 having four haptic actuators 714A-D integrated therein. For example, the haptic actuators 714A-D may be vibrators installed at regular intervals into the seat of the bench 706. The display 206 displays a 3D video stream of the bench 704 with original content, such as a computer generated ball 702, bouncing on the 3D video stream of the bench 704. In FIG. 7A, the computer generated ball 702 is displayed as bouncing on the left side of the bench 704. In conjunction with the computer generated ball 702 striking the displayed bench 704, the processing element 302 activated the haptic actuators 714A and 714B that are near the location on the bench 706 that the computer generated ball 702 appears to strike the displayed bench 704. The haptic actuators 714A and 714B produce haptic feedback 708 that a user 108 sitting on the bench can experience as though a physical ball were bouncing on the bench 706.

Similarly, in FIG. 7B, the display 206 shows the computer generated ball 702 bouncing in the center of the displayed bench 704 and the haptic actuators 714B and 714C producing haptic feedback 710 near the center of the bench 706. In FIG. 7C the display 206 shows the computer generated ball 702 bouncing on the right side of the displayed bench 704 and the haptic actuators 714C and 714D producing haptic feedback 712 near the right side of the bench 706. By employing multiple haptic actuators 714A-D at strategic points, the haptic feedback system 106 may provide haptic feedback that is both temporally and spatially coordinated with the original content that is displayed on the display 206.

Figure 8:
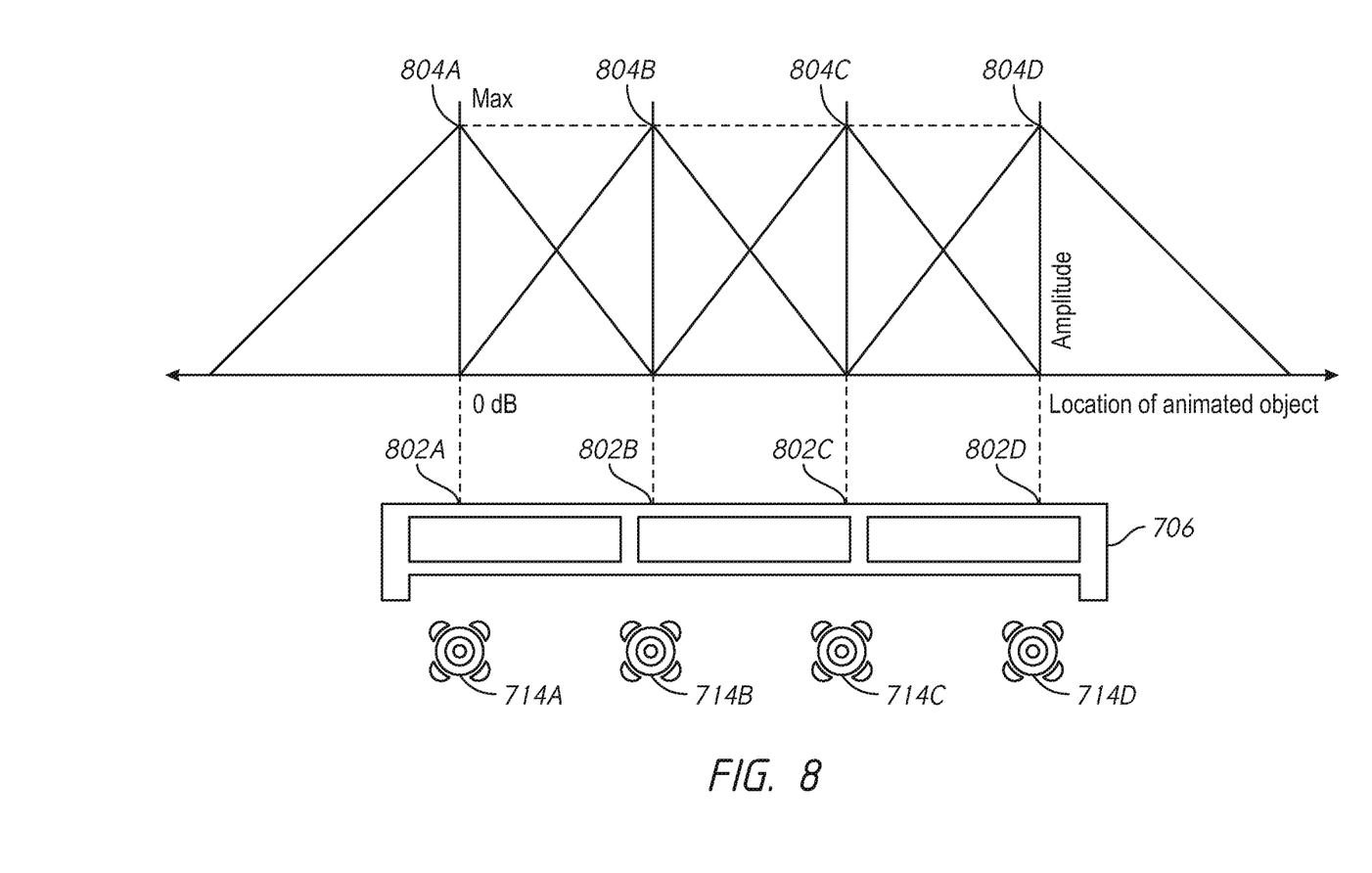
FIG. 8 illustrates driving functions for haptic actuators based on location of augmented reality content.

FIG. 8 illustrates example driving functions for haptic actuators 714A-D based on the location of augmented reality content for use with the embodiment of FIGS. 7A-C. Each haptic actuator 714A-D has its own driving function that determines the driving power provided to the actuator based on the location of the original content. For example, the driving function of each haptic actuator 714A-D may have a corresponding maximum point 804A-D when the original content appears at a corresponding location 802A-D that is directly above the haptic actuator 714A-D. As the original content appears further from the location 802A-D, the amount of power supplied to the haptic actuators 714A-D may decrease. For example, the power may decrease linearly to zero at the location 802A-D of a neighboring haptic actuator 714A-D. In other embodiments, different functions may be used, such as exponential, quadratic, etc.

Returning again to FIG. 6, in decision block 612, the processing element 302 determines whether user interaction is detected. User interaction is detected using a feature recognition application accompanied with the camera 202 and/or the depth sensor 204. The feature recognition application analyzes the depth information and the real-time video stream to locate and monitor features using techniques such as object depth monitoring, edge detection, point detection, etc. Based on this analysis, the processing element 302 determines whether a user has initiated a movement or interaction that relates to the original content displayed on the display 206. Movements may include, for example, standing up, turning their head, raising their hand, jumping, etc. In one example, user interaction may only be recognized as predetermined times, such as in response to a prompt to the user 108 shown on the display 206. In another example, user interaction may be detected at any time and act as an interrupt to alter the course of the augmented content displayed on the display 206. Additionally, because the camera 202 and the depth sensor 204 can detect user interaction for multiple users 108 simultaneously, the processing element 302 can account for multiple users within the environment 100 at the same time, If the processing element 302 determines that user interaction from one or more of the users 108 was detected (decision block 612, YES branch) then the processing element generates reactionary augmentation based on the detected interaction. Once a user interaction has been detected, the processing element dynamically recalculates the original content, for example, by selecting a branch in the original content that is dependent on the type of interaction detected. For example, one set of original content may be selected if the processing element 302 determines that the user raised their right hand, and a different set of original content may be selected if the processing element 302 determines that the user raised their left hand. Alternatively, the original content may be altered based on rules built into the game engine or graphics rending software. For example, the processing element may detect a collision between the user interaction and original content, such determining that a user's hand entered the same space that a ball occupies on the display. A collision engine and physics engine within the game engine may alter the original content realistically based on the detected collision, such as by altering the trajectory of the ball. The new original content is then rendered and displayed in operations 608 and 610 as described above. Additionally, haptic feedback and acoustic augmentation may be added as well, such as the sound of a hand hitting a ball being projected through the acoustic feedback system 104.

Figure 9A:
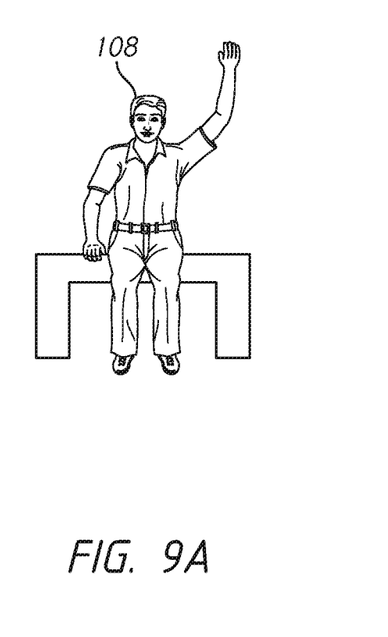
FIGS. 9A and 9B illustrate an example of user interaction in a physical environment and reactionary augmentation shown on a display, respectively.
Figure 9B:
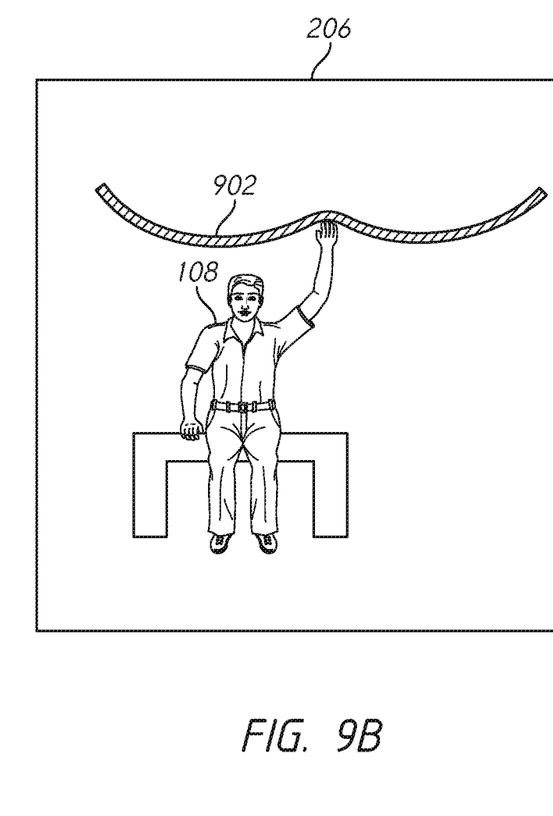

FIGS. 9A and 9B illustrate an example of user interaction in the physical environment 100 and reactionary augmentation shown on the display 206, respectively, in accordance with the embodiment of FIG. 6. In FIG. 9A, a user 108 raises their left hand. The movement is detected by the processing element 302 via the camera 202 and/or the depth sensor 204 as described above with respect to decision block 612. In response to the detected movement, the processing element 302 generates reactionary augmentation including a computer generated rope 902 being deformed at the point where the user's hand appears to contact the computer generated rope 902 on the display 206.

Returning again to FIG. 6, if the processing element 302 determines that no user interaction has been detected (decision block 612, NO branch), then the processing element 302 determines whether the augmented content has ended in decision block 616. If the processing element 302 determines that the content has not ended (decision block 616, NO branch), then the processing element continues to display augmented scene on the display 206. Alternatively, if the processing element 302 determines that the content has ended (decision block 616, NO branch), then the method may terminate, ending the multisensory augmented reality experience of the user 108.

The programs, applications, and methods described herein are identified based upon the application for which they are implemented. However, it should be appreciated that any particular nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A multisensory augmented reality system comprising:
a visual augmentation system that displays augmented content to two or more users from a third-person viewpoint, wherein the augmented content is a blend of original content, integrated with real-time content;
a sensory feedback system that provides sensory feedback to the two or more users based on the augmented content, wherein the sensory feedback dynamically adjusts based on changes in the augmented content; and
a processing element in communication with the visual augmentation system and the sensory feedback system, wherein the processing element performs the following operations:
receive the real-time content of a physical environment from the visual augmentation system, the real-time content including images of the two or more users within the physical environment;
receive depth information corresponding to one or more objects within the physical environment;
construct using the real-time content a visual representation of the physical environment;
utilize the depth information to integrate the original content, as retrieved from a memory location, with the visual representation to generate the augmented content, the augmented content including the images of the two or more users from the real-time content; and
generate and transmit sensory feedback instructions to the sensory feedback system based on the augmented content and the augmented content to the visual augmentation system for display to the two more users on a display device, wherein the display device is the same device for the two or more users.

2. The system of claim 1, wherein the processing element generates the sensory feedback instructions by performing at least the following operations:
detect a change in the augmented content;
determine a sensory feedback event based on the detected change; and
generate sensory feedback instructions to cause the sensory feedback system to effect the sensory feedback event.

3. The system of claim 1, wherein the real-time content comprises a real-time video stream and depth information, and
wherein the processing element reconstructs a three dimensional digital representation of the physical environment by performing at least the following operations:
generate a background video stream of the real-time video stream;
overlay the depth information on the background video stream; and
overlay the real-time video stream on the depth information.

4. The system of claim 1, wherein the processing element integrates the original content with a three dimensional digital representation by performing at least the following operations:
detecting an anchor point in the three dimensional digital representation;
determining a corresponding anchor point in a virtual environment;
aligning the corresponding anchor point in the virtual environment with the anchor point in the three dimensional digital representation; and
rendering the original content in the aligned virtual environment.

5. The system of claim 1, wherein the sensory feedback system comprises:
a haptic feedback system that provides tactile feedback to the two or more users in the physical environment; and
an acoustic augmentation system that provides auditory feedback to the two or more users in the physical environment.

6. The system of claim 5, wherein the haptic feedback system, the acoustic augmentation system, or both are integrated with the one or more physical landmarks.

7. The system of claim 5, wherein the haptic feedback is spatially and temporally coordinated with the augmented content.

8. The system of claim 1, wherein the two or more users interact with the augmented content in the same location to induce changes in the augmented content.

9. The system of claim 8, wherein providing haptic feedback comprises activating one or more haptic actuators integrated with the physical environment.

10. The system of claim 9, wherein the haptic actuators are integrated with a physical landmark in the physical environment and the augmented content is rendered to interact with a digital representation of the physical landmark.

11. The system of claim 1, wherein two or more users interact with the augmented content simultaneously to induce changes in the augmented content and the two or more users experience the augmented content from a third person viewpoint together.

12. A method for providing a multisensory augmented reality environment comprising:
receiving, by a processing element, a real-time video stream of a physical environment, the real time content including images of the two or more users within the physical environment at the same location;
receiving, by the processing element, depth information of one or more objects within the physical environment;
generating, by the processing element, real-time content depicting the physical environment based on the real-time video stream and the depth information;
rendering, by the processing element, augmented content, wherein the augmented content integrates original content that is retrieved from a memory component in communication with the processing element and the real-time content including the images of the two or more users;
generating, by the processing element, sensory feedback instructions to provide sensory feedback based on the augmented content, wherein the sensory feedback instructions are dynamically adjusted to changes in the augmented content;
transmitting, by the processing element, the augmented content to a display and instructions to provide sensory feedback correlated to the augmented content, wherein the same display is viewable by the two or more users.

13. The method of claim 12, wherein generating the real-time content comprises:
generating, by the processing element, a background video stream of the real-time video stream;
combining, by the processing element, the depth information and the background video stream to generate a three dimensional video stream; and integrating, by the processing element, the real-time video stream with the depth information to provide the real-time content.

14. The method of claim 12, wherein rendering the original content comprises:
aligning, by the processing element, a virtual environment with the real-time content; and
rendering, by the processing element, the original content in the aligned virtual environment.

15. The method of claim 14, further comprising:
detecting, by the processing element, a user movement of the two or more users in the real-time content;
modifying, by the processing element, the original content based on the user movement to generate a modified original content;
rendering, by the processing element, the modified original content in the aligned virtual environment; and
transmitting, by the processing element, the augmented content with the modified original content for display.

16. The system method of claim 12, wherein the processing element receives the real-time video stream and the depth information responsive to detecting the two or more users within the physical environment.

17. A method for providing an augmented reality environment comprising:
determining, by a processing element, a correspondence between a camera and a depth sensor;
receiving, by the processing element, a calibration image and depth information corresponding to a physical environment;
generating, by the processing element, a real-time content depicting the physical environment based on the image, the depth information, and the correspondence, wherein the real time content includes images of at least two users within the physical environment;
detecting, by the processing element, a physical landmark in the real-time content;
aligning, by the processing element, a virtual representation of a virtual-landmark in a virtual environment with the physical landmark in the real-time content;
generating, by the processing element, original content in the virtual environment; and
transmitting, by the processing element, the original content and the real-time content to a display to be viewed by the at least two users based on the depth information, wherein the depth information corresponds to a depth from the display to the at least two users.

18. The method of claim 17, wherein aligning the virtual representation of the landmark with the physical landmark comprises:
detecting an anchor point in the real-time content;
determining a corresponding anchor point in the virtual environment;
aligning the corresponding anchor point in the virtual environment with the anchor point in a three dimensional digital representation; and
rendering the original content in the aligned virtual environment.

19. The method of claim 17, wherein generating, the real-time content comprises:
generating, by the processing element, a background image based on the calibration image of the physical environment;
combining, by the processing element, the depth information and the background image; and
integrating, by the processing element, the calibration image with the depth information.

20. The method of claim 19, wherein the image of the physical environment is received from the camera and the depth information is received from the depth sensor.

21. The method of claim 19, wherein the integrated calibration image and depth information comprises gaps and the background image provide pixel data that compensate for the gaps in the depth information.

22. A multisensory augmented reality system comprising:
a visual augmentation system including a display that displays augmented content to two users from a third-person viewpoint, such that the two users can view the content together, wherein the two users are physically separated from the display, and the augmented content is a blend of original content integrated with real-time content, wherein the original content is stored content;
a sensory feedback system that provides sensory feedback to the two users based on the augmented content, wherein the sensory feedback dynamically adjusts based on changes in the augmented content; and
a processing element in communication with the visual augmentation system and the sensory feedback system, wherein the processing element performs the following operations:
receive the real-time content of a physical environment from the visual augmentation system, wherein the real-time content includes depth information of two users relative to the visual augmentation system detected by a depth sensor and images of the two users within the physical environment;
construct using the real-time content a visual representation of the physical environment;
integrate the original content with the visual representation to generate the augmented content including the images of the two users based on the depth information, wherein the depth information corresponds to a distance of the users from the display device; and
generate and transmit sensory feedback instructions to the sensory feedback system based on the augmented content and the augmented content to the visual augmentation system for display to the two users.

23. The system of claim 22, wherein the processing element generates the sensory feedback instructions by performing at least the following operations:
detect a change in the augmented content;
determine a sensory feedback event based on the detected change; and
generate sensory feedback instructions to cause the sensory feedback system to effect the sensory feedback event.

24. The system of claim 22, wherein the real-time content comprises a real-time video stream and depth information, and
wherein the processing element reconstructs a three dimensional digital representation of the physical environment by performing at least the following operations:
generate a background video stream of the real-time video stream;
overlay the depth information on the background video stream; and
overlay the real-time video stream on the depth information.

25. The system of claim 22, wherein the processing element integrates the original content with a three dimensional digital representation by performing at least the following operations:

detecting an anchor point in the three dimensional digital representation;

determining a corresponding anchor point in a virtual environment;

aligning the corresponding anchor point in the virtual environment with the anchor point in the three dimensional digital representation; and rendering the original content in the aligned virtual environment.

26. The system of claim 22, wherein the sensory feedback system comprises:

a haptic feedback system that provides tactile feedback to two users in the physical environment; and an acoustic augmentation system that provides auditory feedback to the two users in the physical environment.

27. The system of claim 26, wherein the haptic feedback system, the acoustic augmentation system, or both are integrated with the one or more physical landmarks.

28. The system of claim 26, wherein the haptic feedback is spatially and temporally coordinated with the augmented content.

* * * * *